(12) United States Patent
Lessard et al.

(10) Patent No.: US 7,015,792 B2
(45) Date of Patent: Mar. 21, 2006

(54) VEHICLE ANTI-THEFT SYSTEM AND METHOD

(75) Inventors: Hugo Lessard, Loretteville (CA); Éric Gros-Louis, Wendake (CA)

(73) Assignee: Technologie Kolombo Inc., Quebec (CA)

( * ) Notice: Subject to any disclaimer, the term of this patent is extended or adjusted under 35 U.S.C. 154(b) by 246 days.

(21) Appl. No.: 10/313,031

(22) Filed: Nov. 29, 2002

(65) Prior Publication Data

US 2003/0128104 A1    Jul. 10, 2003

Related U.S. Application Data

(63) Continuation of application No. PCT/CA01/00775, filed on May 30, 2001, which is a continuation-in-part of application No. 09/711,907, filed on Nov. 15, 2000, now abandoned.

(30) Foreign Application Priority Data

May 30, 2000   (CA) ................................. 2309899

(51) Int. Cl.
   *G05B 19/00*    (2006.01)
(52) U.S. Cl. .................. 340/5.61; 340/426.11

(58) Field of Classification Search ............... 340/5.61, 340/988, 825.49, 825.37, 990, 902, 425.5, 340/426.11, 539.1; 701/115; 455/404.1, 455/420; 342/44, 457
See application file for complete search history.

(56) References Cited

U.S. PATENT DOCUMENTS

| | | | | |
|---|---|---|---|---|
| 5,497,149 | A | * | 3/1996 | Fast ........................... 340/988 |
| 5,513,244 | A | * | 4/1996 | Joao et al. ................ 455/404.1 |
| 5,808,564 | A | * | 9/1998 | Simms et al. ............... 340/990 |
| 5,917,423 | A | * | 6/1999 | Duvall .................. 340/825.37 |
| 6,411,887 | B1 | * | 6/2002 | Martens et al. ............. 701/115 |

* cited by examiner

*Primary Examiner*—Michael Horabik
*Assistant Examiner*—William Bangachon
(74) *Attorney, Agent, or Firm*—Merchant & Gould P.C.

(57) ABSTRACT

An anti-theft system comprises a digital code in a key ring. The code is transmitted to a client box installed in a car. The box analyses the code and, in the case of theft, transmits a distress signal to a police car. The police car is equipped with a receiver and a display to display information concerning the stolen vehicle. The police officer can stop the stolen vehicle or can use a switch on the police car unit that sends a signal to a receiver in the client box and thus turns off the fuel pump of the car.

26 Claims, 14 Drawing Sheets

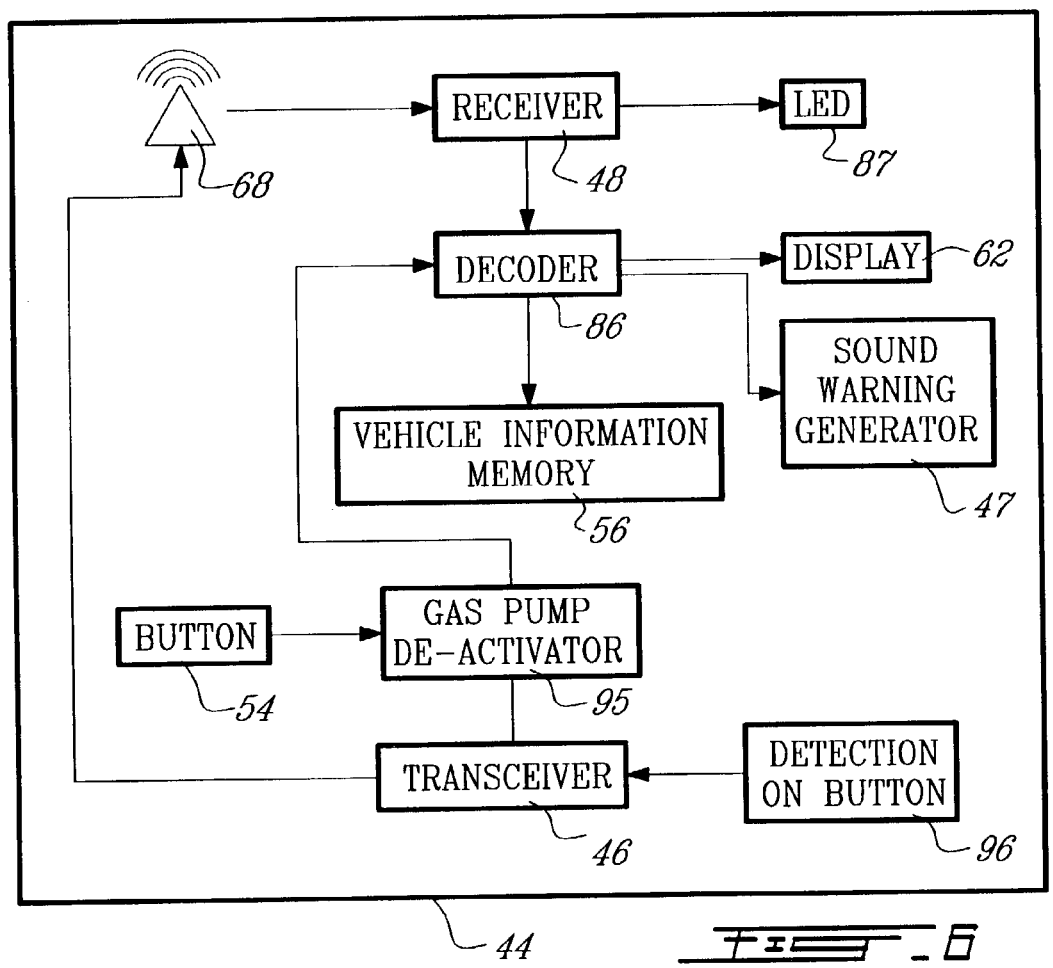

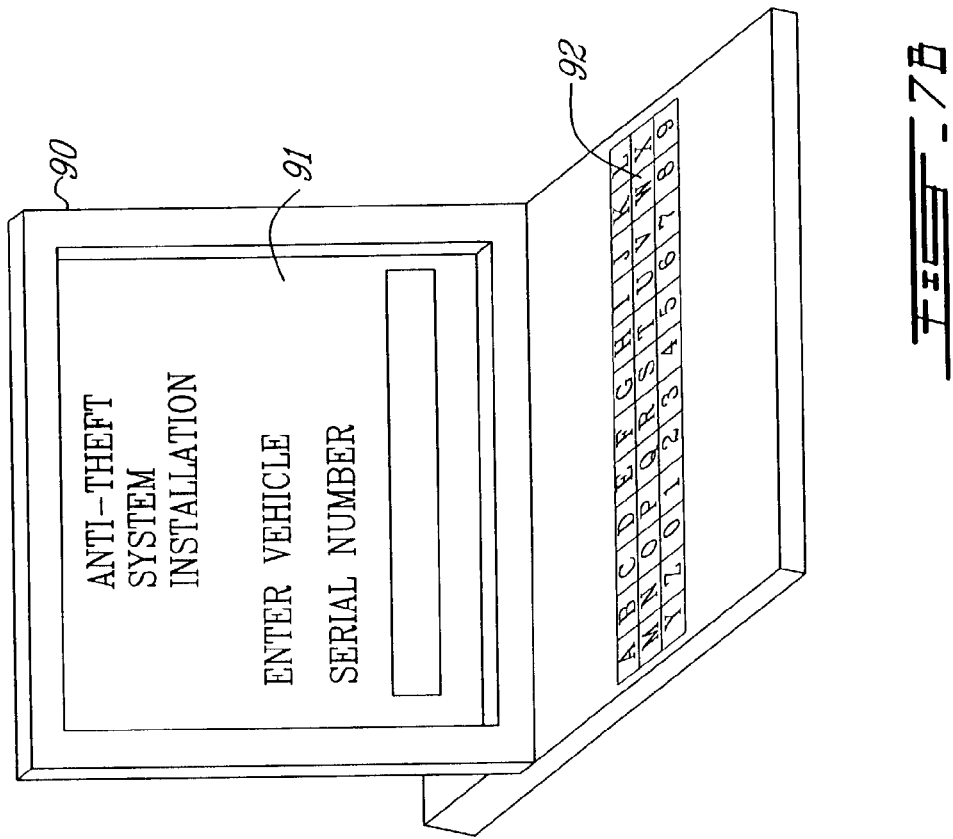
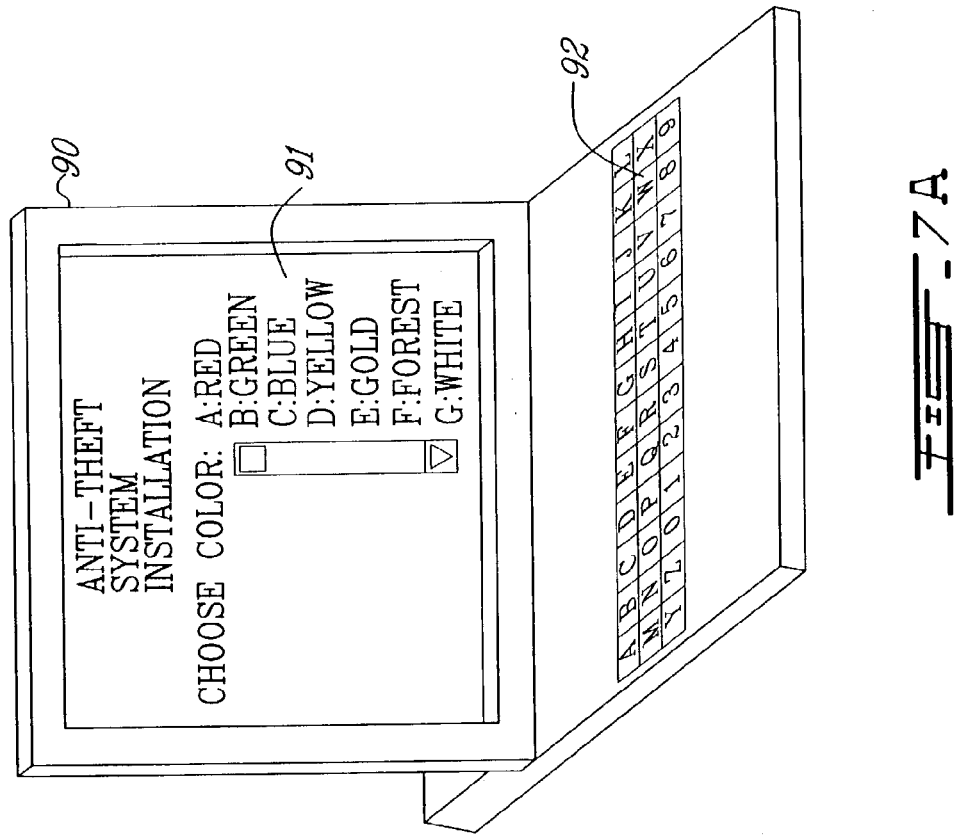

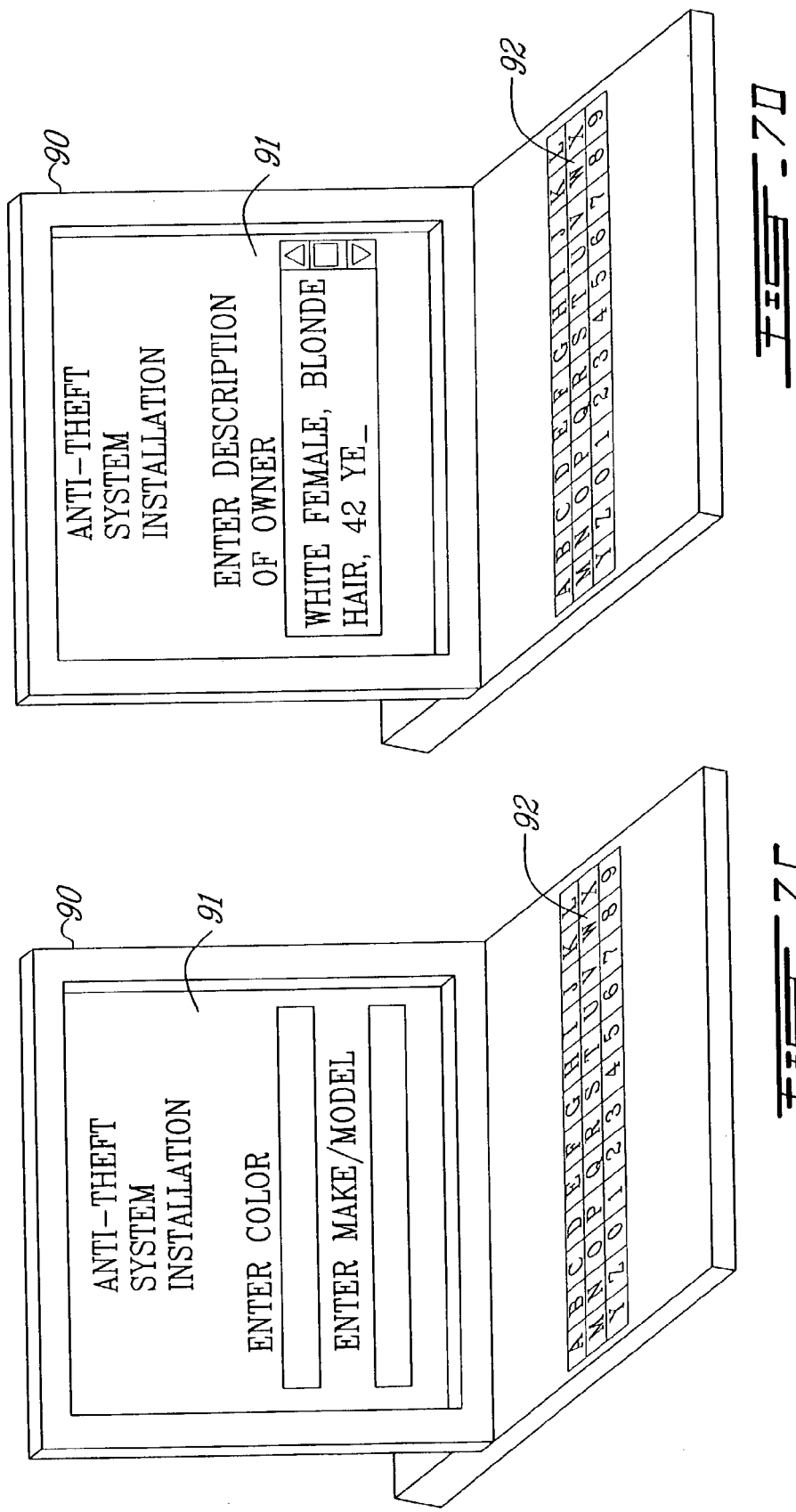

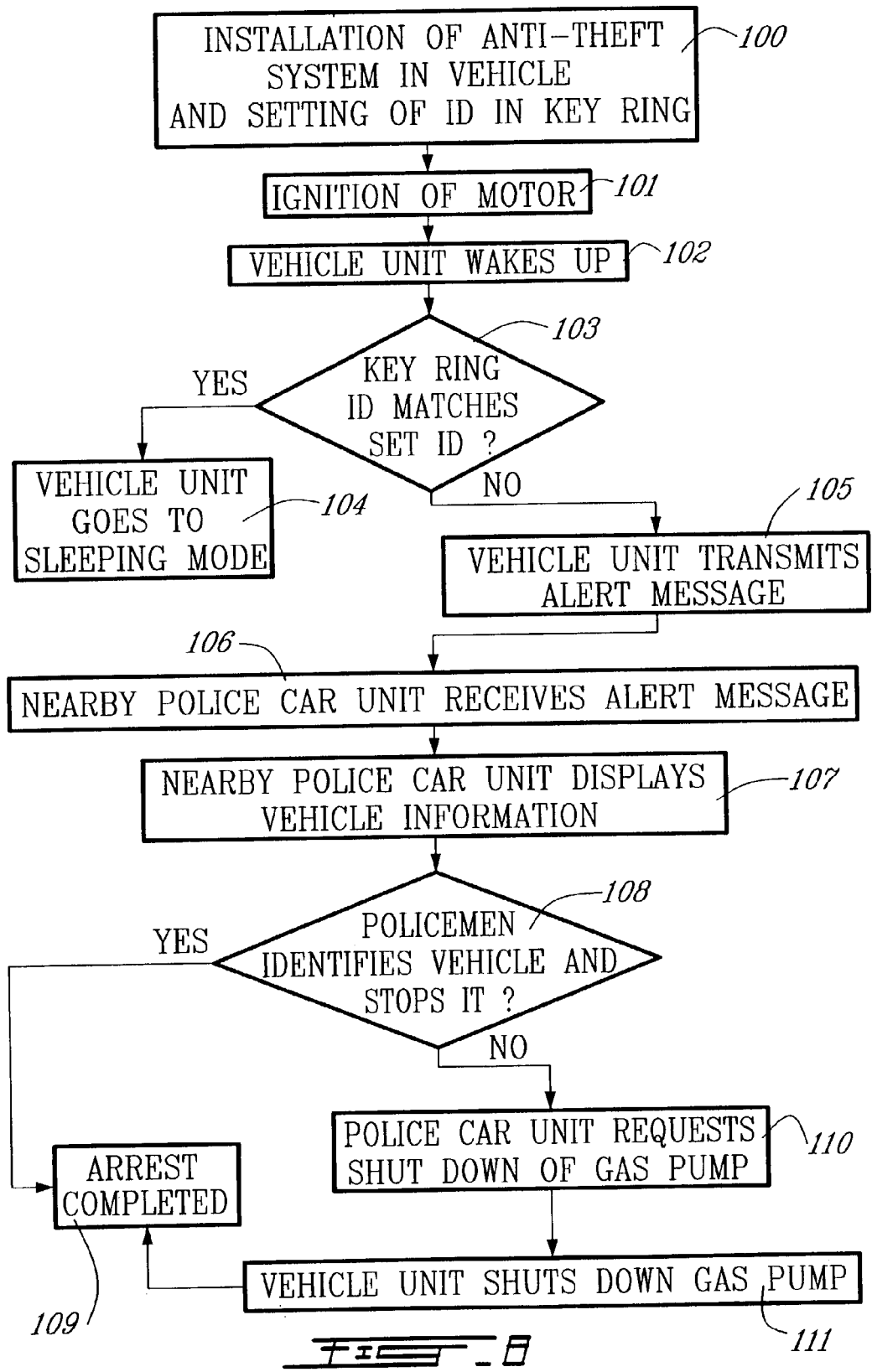

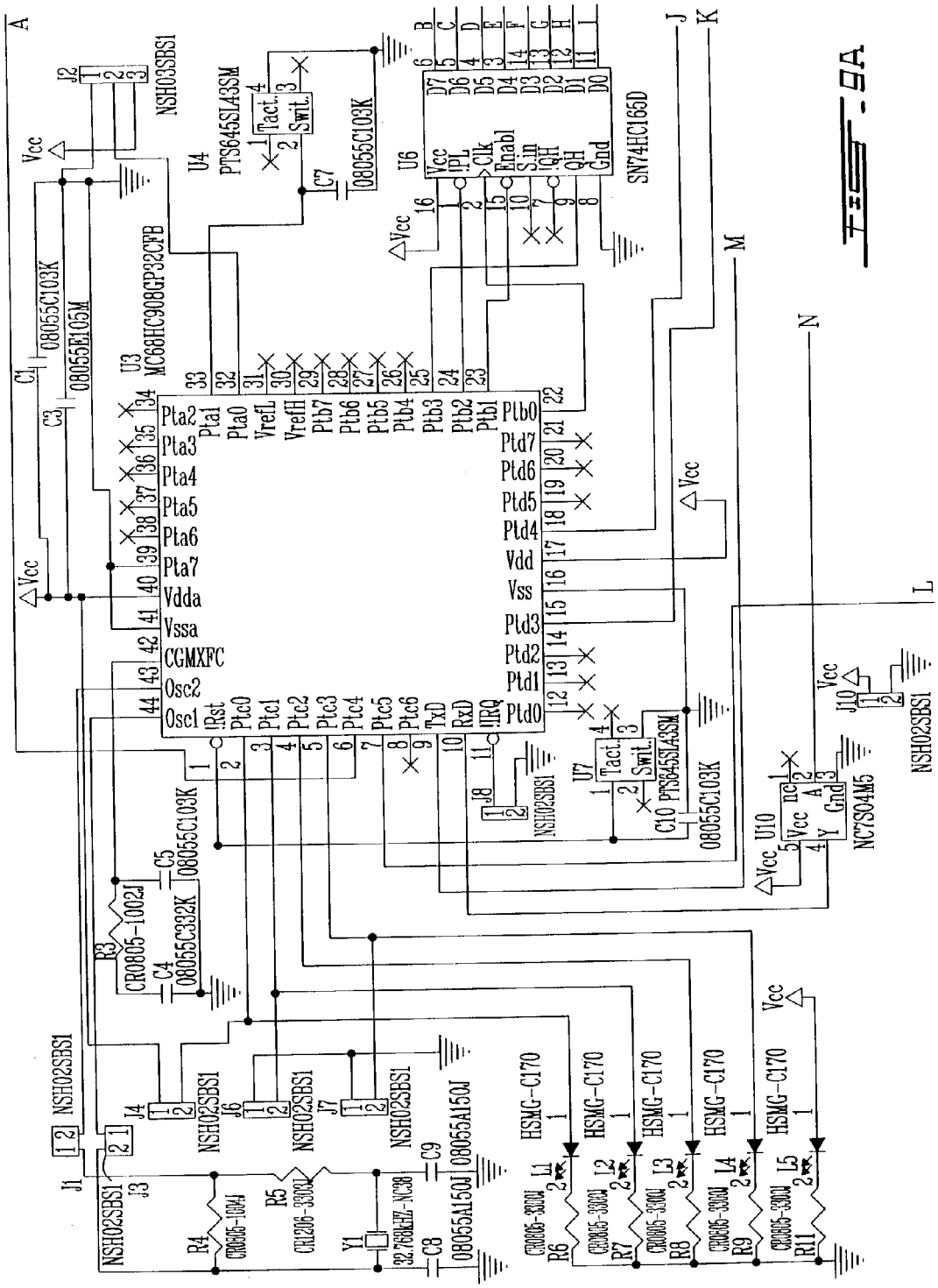

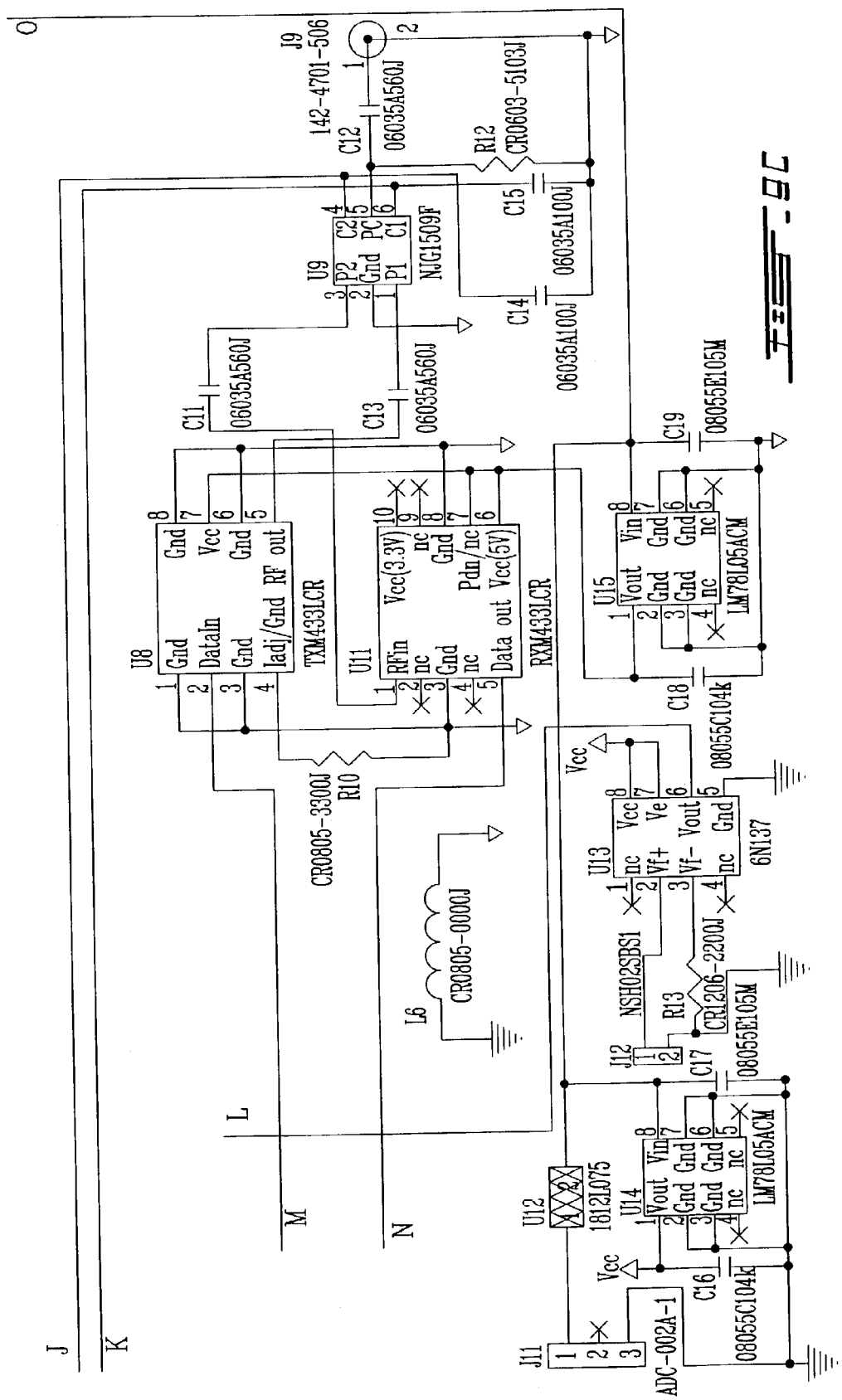

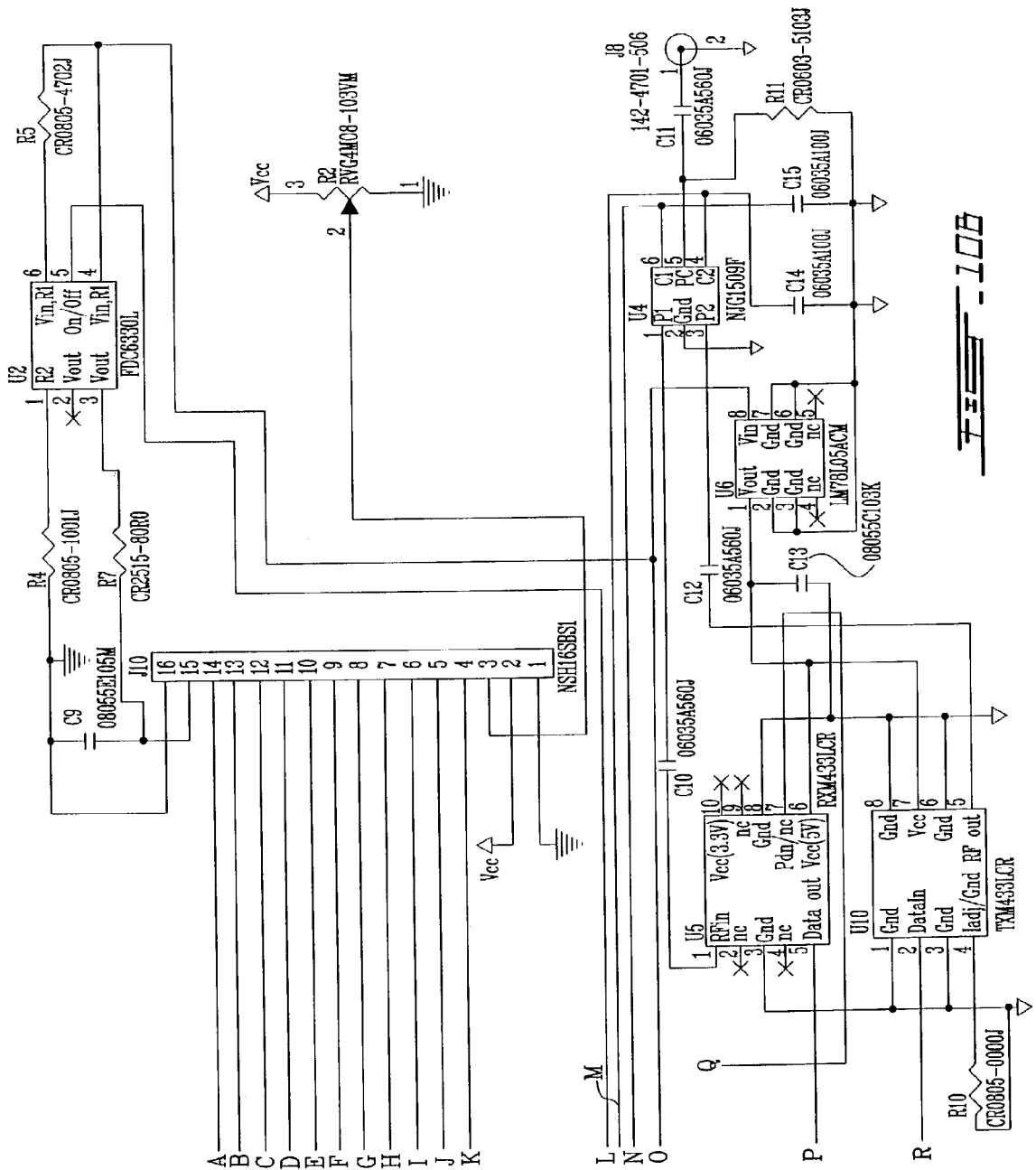

VEHICLE ANTI-THEFT SYSTEM AND METHOD

CROSS-REFERENCE TO RELATED APPLICATIONS

This application is a continuation of PCT patent application No PCT/CA01/00775 filed May 30, 2001, which is in turn a continuation-in-part of U.S. application Ser. No. 09/711,907 filed Nov. 15, 2000, now abandoned.

FIELD OF INVENTION

The invention relates to the field of vehicle anti-theft systems. More specifically, it relates anti-theft systems in which a police vehicle detects that a vehicle is stolen and stops the vehicle.

BACKGROUND OF THE INVENTION

Prior art vehicle anti-theft systems concentrate on providing good tracking methods once the vehicle has been declared as stolen. Their methods necessitate the following steps: declaration by the owner that the vehicle is stolen, activation of the tracking system by the anti-theft system provider; emission of a signal from the stolen vehicle, tracking of the vehicle by the anti-theft system provider, communication with the police to request support and authority to seize the vehicle, arrival of the police on the location of the stolen vehicle and seizing of vehicle. An example of such a tracking system is U.S. Pat. No. 4,818,998 to Apsell and Stapelfeld and assigned to Lo-Jack Corporation for a Method of and System and Apparatus for locating and/or tracking stolen or missing vehicles and the like.

Other prior art systems are aimed at locating objects or people by using the same principle: the lost of the object or person must be communicated to the system for a transceiver on the object or person to start emitting a signal and therefore allowing tracking of the transceiver. An example of such a locating system is found in U.S. Pat. No. 5,021,794 to Lawrence which discloses a personal emergency locator system.

A classic example of a stolen vehicle scenario is as follows: a person goes shopping at a shopping center and parks his vehicle in the parking lot. He enters the shopping mall and stays in the mall for about two hours. When he exits the mall to go back to his vehicle, he realizes that it is gone. After having alerted the mall security, he contacts his anti-theft service provider and gives the pertinent information allowing a search for the vehicle to be conducted. A tracking vehicle is dispatched to the locating of the stolen vehicle. Almost two and a half hours have elapsed since the moment of the theft. The thief, if a professional thief, has had time to drive the car through the city, into a van headed for a freight boat or across a border and has even had time to disassemble portions of the vehicle, including the tracking system transceiver, which is left somewhere along the road. If the tracking vehicle reaches the location of the transceiver, they will usually solely find the transceiver. Most of the time, they will not be able to dispatch the tracking vehicle to the location of the transceiver because it will be emitting from a different jurisdiction or from the sea. The owner will therefore have paid for the installation of the system and the annual membership fee plus service charges for the actual tracking of the vehicle without being able to retrieve the vehicle. If the vehicle is located, the service provider then contacts the police to obtain the authority of seizing the vehicle. If the vehicle is moving, the tracking vehicle must engage into a pursuit of the stolen vehicle until the police can take over the chase and seize the vehicle. This is hazardous for both the service provider and the police.

The main problems with these prior art systems are therefore that the transceiver can be easily removed from the stolen or lost object, that by the time the location of the object can be tracked down, the object has been transported in unreachable locations, that arresting the thief involves dangerous car pursuits. This is caused by the delay in reporting the stealing of the object by the owner and by the fact that police intervention is delayed.

Driving a car is a privilege subject to laws made by the State, such as the possession of a driver's license. The motorist is licensed under the State that is represented by the police. So the vehicle belongs to the licensee that has a delegate authority. In absence of the motorist, the vehicle belongs to the authority that may stop it. This is why a police officer can stop and seize a vehicle if it is properly identified as stolen.

SUMMARY OF THE INVENTION

Since it is desirable to reduce the number of stolen vehicles, it would be highly useful to provide an anti-theft system in which the police is the first and only entity involved in the process.

It is a first object of the present invention to provide a system and method for identifying stolen vehicles.

It is a second object of the present invention to provided a system and method for immobilizing a stolen vehicle once it has been identified as being stolen.

It is a further object of the present invention to provide an owner identification device which allows proper identification of the owner of the vehicle and prevents the vehicle from being identified as stolen.

According to a first broad aspect of the present invention, there is provided a method for identifying a stolen vehicle, the method comprising: detecting a usage of the vehicle; requesting, at a vehicle unit, an identification from an identification device; if the identification is received, comparing the identification with an internal identification setting; if the internal identification setting does not match the received identification or if the identification is not received, emitting an alert message comprising information concerning the vehicle; receiving the alert message at a police car unit; and displaying the information concerning the vehicle at the police car unit, whereby the stolen vehicle is identified and can be stopped by a police officer without an intervention of an owner of the stolen vehicle.

Preferably, the method further comprises, after the step of identifying: sending a power supply shut-down message to the vehicle unit; shutting down a power supply of the vehicle, whereby the police officer can choose to stop the stolen vehicle by shutting down its power supply.

According to another aspect of the present invention, there is provided a vehicle anti-theft system comprising: an identification device having an identification request receiver for receiving an identification request; an identification store having a stored identification and an identification provider for retrieving the stored identification and sending the stored identification in response to the request. The vehicle anti-theft system also comprises a vehicle anti-theft unit having a usage detector for detecting a usage of the vehicle for its transportation from one location to another; a vehicle transmitter for requesting an identification of a driver of the vehicle once the usage is detected; a vehicle receiver for receiving a response to the request for the identification; an information store having information concerning the vehicle and an internal identification setting; an owner detector for detecting if the internal identification setting matches an identification received in the response; an information emitter for emitting the information concerning the vehicle if the identification received does not match the internal identification setting. Whereby the information concerning the vehicle is received by a patrol car and the vehicle is identified as being stolen by an officer in the patrol car and can be stopped without an intervention of an owner of the stolen vehicle.

Preferably, the apparatus further comprises, in the vehicle unit, a power supply shut-down receiver for receiving a command to shut down a power of the vehicle; a power shut-down circuit to shut-down a power of the vehicle; whereby an officer can choose to stop the stolen vehicle by shutting down its power supply.

BRIEF DESCRIPTION OF THE DRAWINGS

These and other features, aspects and advantages of the present invention will become better understood with regard to the following description and accompanying drawings wherein:

FIG. 1 comprises FIG. 1A, FIG. 1B and FIG. 1C and represents the items which interact with one another to create the anti-theft system of the preferred embodiment;

FIG. 6 is a block diagram of the components of the police transceiver/receiver box;

FIG. 7 comprises FIG. 7A, FIG. 7B, FIG. 7C and FIG. 7D and represents examples of user interfaces for the installation of the anti-theft system;

FIG. 8 is a flow chart of the main steps carried out when using the present invention;

FIG. 9A, FIG. 9B and FIG. 9C are parts one, two and three of the circuit diagram of the preferred client car standalone module;

FIG. 10A and FIG. 10B are parts one and two of the circuit diagram of the preferred police car standalone module.

DESCRIPTION OF THE PREFERRED EMBODIMENT

Figure 1A:
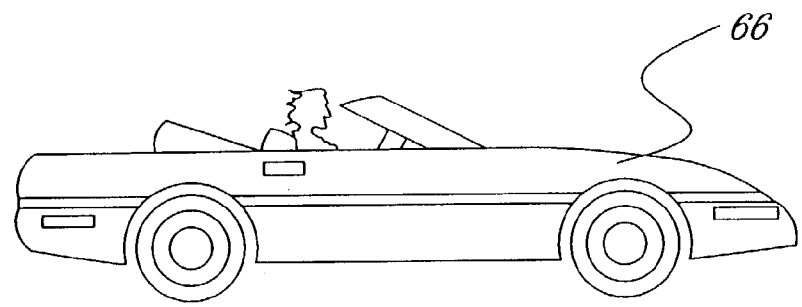
FIG. 1A is a perspective view of a user's vehicle equipped with the anti-theft system of the preferred embodiment.
Figure 1B:
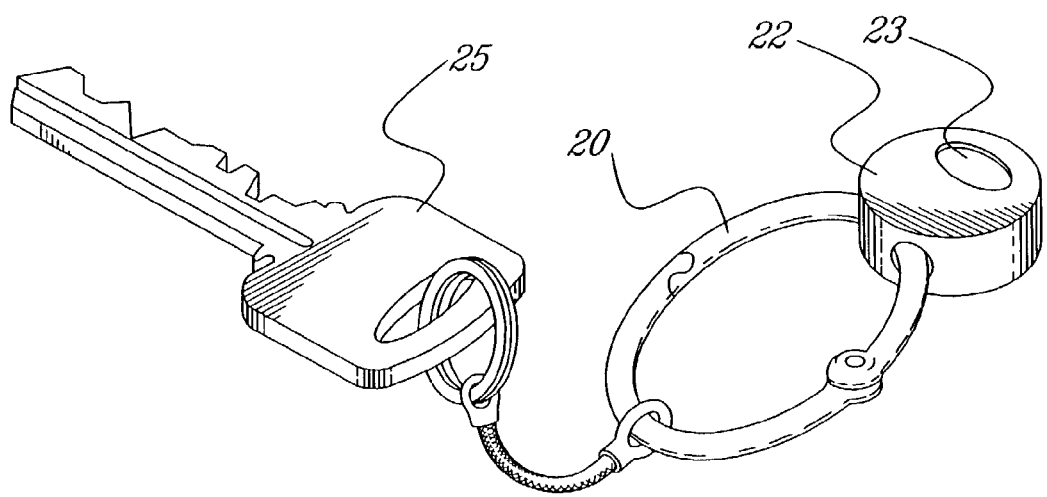
FIG. 1B is a perspective view of a key, a key ring and an identification device according to the preferred embodiment.
Figure 1C:
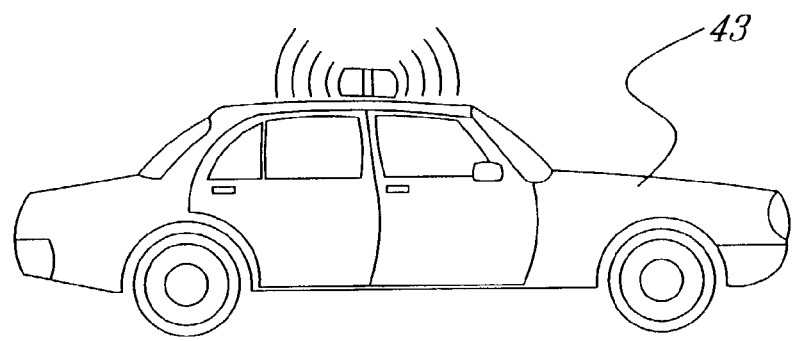
FIG. 1C is a perspective view of a police car equipped with the police box of the preferred embodiment.

The invention can be summarized as follows. Its main components are shown in FIG. 1A, FIG. 1B and FIG. 1C. An identification device 22 is installed on a key ring 20 of a vehicle owner. The vehicle 66 is equipped with a transmitter box. When the key ring 20 is within an adequate range of the vehicle transmitter box and the vehicle 66 is started, the vehicle transmitter box requests that the key ring 20 identifies itself. The identification device then transmits its identification number to the transmitter box. If the identification number of the key ring matches that of the box, the box enters an inactive mode. When the key ring is not within an adequate range of the vehicle transmitter box or when the identification number does not match that of the transmitter box and the vehicle is started, the transmitter box transmits the make and color of the vehicle within a range.

Police cars 43 are equipped with a complementary receiver box which receives the transmitted information about the vehicle 66, when within a certain range of the vehicle. The receiver box further has display means to display the make and color of the vehicle to the police officer. The receiver box automatically becomes awake as soon as a transmission of a make and model of a vehicle is received. Preferably, the display means also has a warning means such as a beep emitting device to warn the police officer that a stolen vehicle has been identified by the receiver box. The police officer can then visually identify the vehicle among the surrounding vehicles and arrest the thief.

In case the thief is not cooperative, the police officer can remotely stop the vehicle by using a remote deactivator for the electrical power of the gas pump of the vehicle. The police officer will choose an appropriate time and location of the vehicle prior to using such a drastic measure to ensure the passerby's safety. In order to do so, the vehicle must be further equipped with a system for receiving a signal from the police and shutting down the electrical power of the gas pump.

In the ideal situation, all patrol cars of a given area would be equipped with receivers that receive the signal of the device installed in the car. Patrol cars 43 would be placed at strategic locations such as at the exit of shopping mall parking lots and would be able to identify and arrest stolen vehicles and their thieves. In order to facilitate the visual identification of the stolen vehicle, a range of 100 m has been preferred for the range of transmission of the vehicle transmitter box.

Once the vehicle has been stopped using the deactivation of the electrical power of the gas pump, a simple adjustment of the deactivation system allows to restart the vehicle within a three minute delay.

The vehicle transmitter box is fed by the electrical system of the vehicle and will be able to transmit as long as the vehicle battery has some power left. The transmitter box will be fully hidden within the vehicle to ensure that the thieves have no knowledge of its installation.

The patrol vehicle receiver box has, in memory, a list of all the makes and colors of vehicles in circulation in the particular territory together with the codes used when programming the anti-theft system. Updates to this list need to be made regularly to ensure that the patrol box recognizes the stolen vehicle and can display its information to the police officer.

FIG. 1A shows the user's vehicle 66. FIG. 1B shows a key ring 20 having an identification device 22 programmed with a ten-digit code which is hidden in the identification memory 23. The key ring 20 is preferably attached to the key 25 of the vehicle. FIG. 1C shows the patrol car 43. The identification stored in the identification memory 23 can have any number of bits, although three to four bytes should suffice to code the identification.

The vehicle transmitter box 24 is connected to the vehicle battery by wires 28. The vehicle transmitter box 24 comprises a transceiver 26 that sends a signal to the identification device 22 to receive the identification code from the memory 23. The transceiver 26 receives the code from memory 23 and compares it to the stored identification number in the transmitter box 24. A data switch 36 that identifies the color and the make of the vehicle is provided and is accessible from the outside of the transmitter box 24 in case a change in its information is necessary. A micro-controller 32 controls all the operations of the transmitter box 24. A receiver 30 and an antenna 34 are also provided in the transmitter box 34 to receive the identification code from the key ring. The antenna is also used to transmit the information about the vehicle to the surrounding vehicles.

Figure 2:
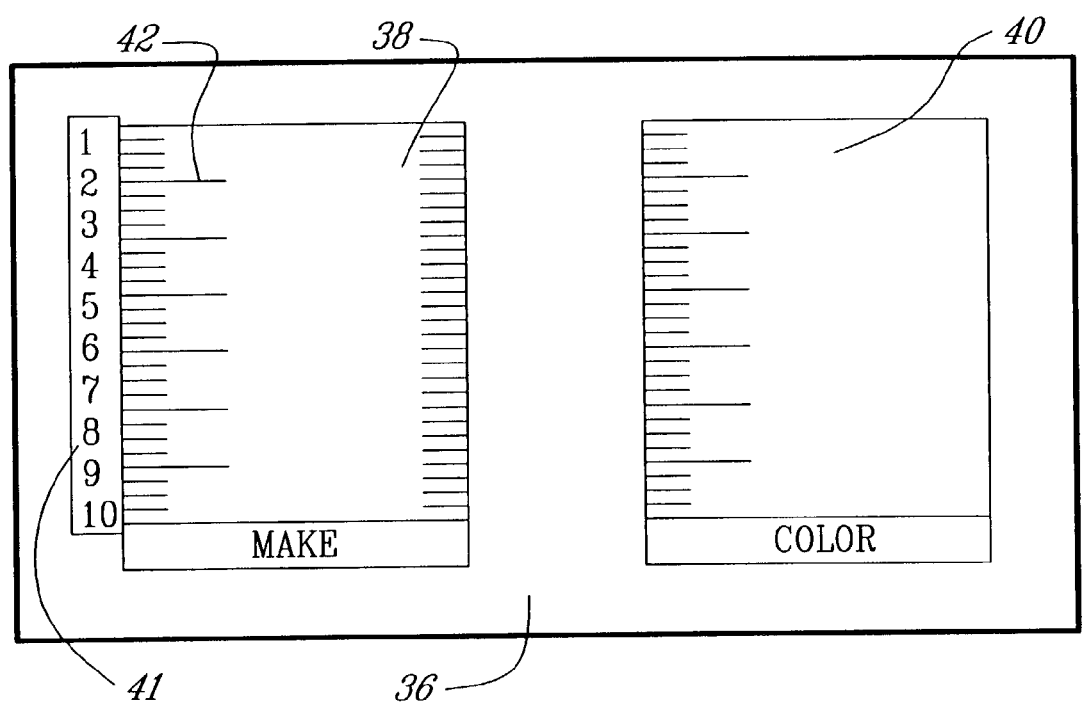
FIG. 2 is a detail of component 36, the DIP switch used to program the color and make/model of the vehicle.

FIG. 2 shows the data switch 36 with its two main components: a make panel 38 and a color panel 40. The data switch 26 is preferably a set of Dual In-line Package (DIP) switches which allow creation of numerical codes. One code corresponds to the make and another for the color. For example, code 246 corresponds to a Dodge Caravan. DIP switches are preferred since they are simple to set and modify. The color and the model/make of the vehicle is preferably coded using 4 bytes of 8 bits.

They will first be set at the time of installing the anti-theft system in the vehicle and will therefore be set by garage mechanics. It is therefore necessary that it be simple to set the information concerning the vehicle into the system. However, to keep the vehicle unit simple and to facilitate the installation procedure, an alphanumerical keyboard can be connected to the vehicle via a RF connection. The information entered using the alphanumerical keyboard is then stored in a memory inside of the vehicle unit. Examples of the installer interfaces and alphanumerical keyboard are shown in FIG. 7A to FIG. 7D and are explained below.

It will be understood that the identification information concerning the vehicle could include many other types of information such as the year, the vehicle license plate number, the sex, age and hair color of the main owner, etc. It will also be understood that the information concerning the vehicle could be inputted and stored in a number of different ways in the identification device 22 and in the data switch 36.

For example, an external input device could be connected to the identification device 22 or to the data transmitter box 24 to enter the appropriate information. This input device could have a small numerical keyboard to enter the codes and a small display to display the entered codes and make sure that the proper information is entered before setting the device. It could also be possible to provide a full interface device that would be used by the garage mechanics for each anti-theft system installed. This full interface device would preferably be a computer having a user-friendly interface. The user-friendly interface could have lists of makes and models supported by the anti-theft system, could have search tools used to locate the appropriate information in the lists, could ensure that the identification codes are at all times encrypted until digitally or mechanically stored in the vehicle to ensure their secrecy.

A few examples of embodiments for the full interface device are shown in FIG. 7A, FIG. 7B, FIG. 7C and FIG. 7D. FIG. 7A shows a full interface device 90 having a display 91 and input means such as a keyboard 92. In FIG. 7A, the Installation software displays a list of potential colors and requests an input from the person installing the anti-theft system to choose a color to be set. Each color in the scrollable list is attributed a letter which is used to pick the right color for the vehicle. A similar screen would be shown to obtain the make/model of the vehicle. In FIG. 7B, the installation software requests that the serial number of the vehicle be entered to allow the software to uniquely retrieve the color, make, model, year, etc. of the vehicle from a database containing all of that information for the vehicles in circulation in that territory.

In FIG. 7C, the installation software requests that the color and make/model be typed in by the installer. The software then uses search tools to identify a color and make/model closely corresponding to that entered by the installer. A confirmation page would be displayed to the installer once the search tool has identified a particular color and make/model to ensure proper installation. In FIG. 7D, an optional description of the owner can be entered in a text box by the installer to give more information to the police officer in case the anti-theft system would have started emitting even though the owner is driving the vehicle. In that example, the text entered is "White female, blond hair, 42 ye" and the cursor is located at the end of "ye", implying that the installer will complete the entered text with "ars old".

The police box 44 comprises a transceiver 46, a memory 56, which stores the codes of color 60 and make 58 and transmits the data to the LCD screen 62. This memory is preferably internal to the micro controller. The micro controller is preferably of the type MC68HC908GP32. Also provided in the patrol car box 44 are a button 54 to de-activate the fuel pump of the stolen vehicle and a micro-controller 50 that is programmed to control all of the operations. The police box 44 also comprises a police receiver to receive the signal emitted by the vehicle transmitter box 24 and activate the micro-controller 50.

The button 54 sends a signal to the transmitter box 24 of the vehicle. The signal is received by the antenna 34 and the micro-controller 32. The micro-controller then commands the fuel pump deactivation module to cut off the electrical power to the fuel pump 64 of the vehicle 66. The button 54 is activated manually by the police officer.

Figure 3:
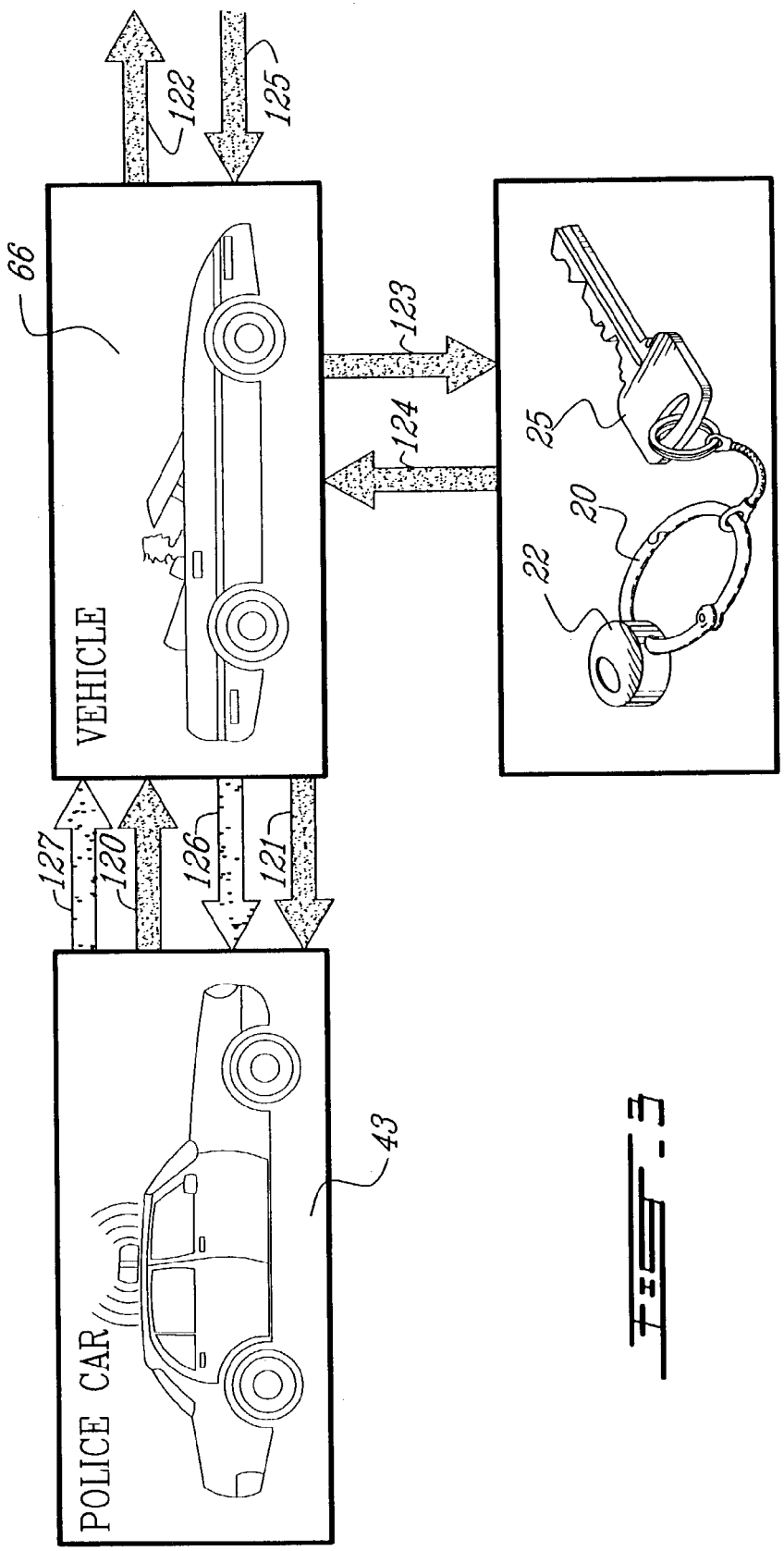
FIG. 3 is an illustration of the sequence of the communications between the police vehicle unit, the vehicle equipped with the anti-theft system and the identification device.

FIG. 3 is an illustration of the communications which can occur between the police car unit, the vehicle unit and the identification unit. The scenarios are as follows:

A. Identification of the Owner

A1. The owner of the vehicle is driving the vehicle. When the vehicle unit requests 123 an identification of the driver, a response 124 is received from the identification device.

A2. The vehicle is being stolen. When the vehicle unit requests 122 an identification of the driver, a response is not received from the identification device or a falsified response 125 is received from a counterfeit device.

B. Communication with the Police

B1. The police vehicle is the one who is emitting a "monitoring the surroundings" signal. The police car emits 120 a signal requesting an indication that a vehicle is stolen. If any surrounding vehicle has a "stolen" status, it replies 121 with its information. If it is not stolen, it ignores the requests from the police vehicle.

B2. The stolen vehicle is the one who is emitting a "I am stolen" message 126. This message is picked up by the police and the vehicle is identified.

C. Stopping of the Stolen Vehicle

C1. After the vehicle information message 121 is received from the vehicle, the police officer can decide to physically stop it by sending a stop message 127 which will make the vehicle stop by shutting down the supply to the fuel pump or by other means.

C2. After the "I am stolen" message 126 is received, the police officer can decide to physically stop it by sending a stop message 127 which will make the vehicle stop by shutting down the supply to the fuel pump or by other means. As will be understood, the identification of the owner can be done prior to the communications in B1 or after the signal 120 is received by the vehicle.

Figure 4:
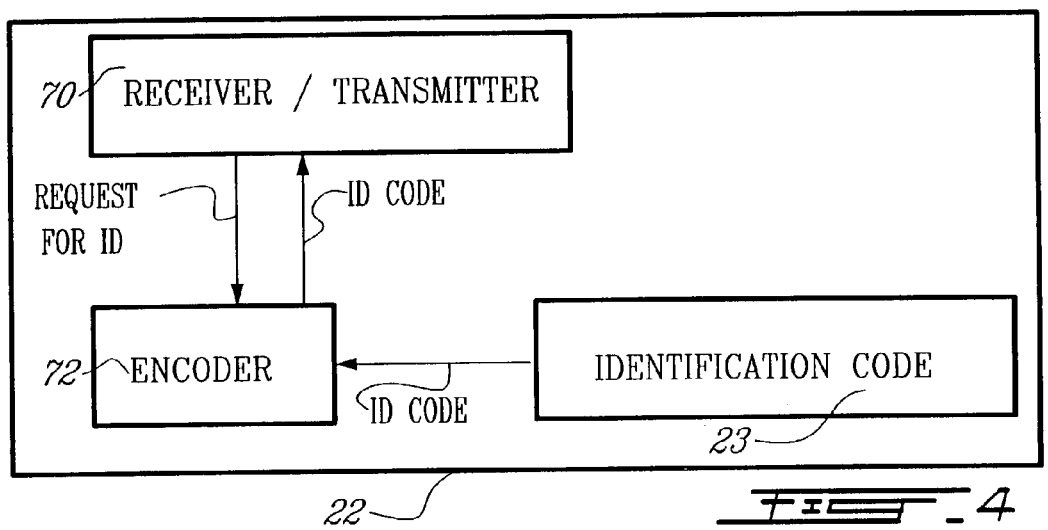
FIG. 4 is a block diagram of the components of the key ring.

FIG. 4 is a block diagram of the components of the key ring identification module 22. A receiver/transmitter 70 receives a signal from the vehicle requesting identification of the key ring. The receiver/transmitter 70 sends a signal to the encoder 72 to retrieve the identification code. The encoder 72 obtains the identification code from the identification code memory 23. It preferably encodes it and sends it to the receiver/transmitter 70 to be transmitted to the transmitter box 24 at a frequency of transmission A which is preferably 916 MHz. The key ring identification module 22 is powered by a battery of 1.8 volts. The key ring identification module 22 can be programmed on a case-by-case basis with the proper identification code or it can be factory set to correspond to a particular vehicle box.

Figure 5:
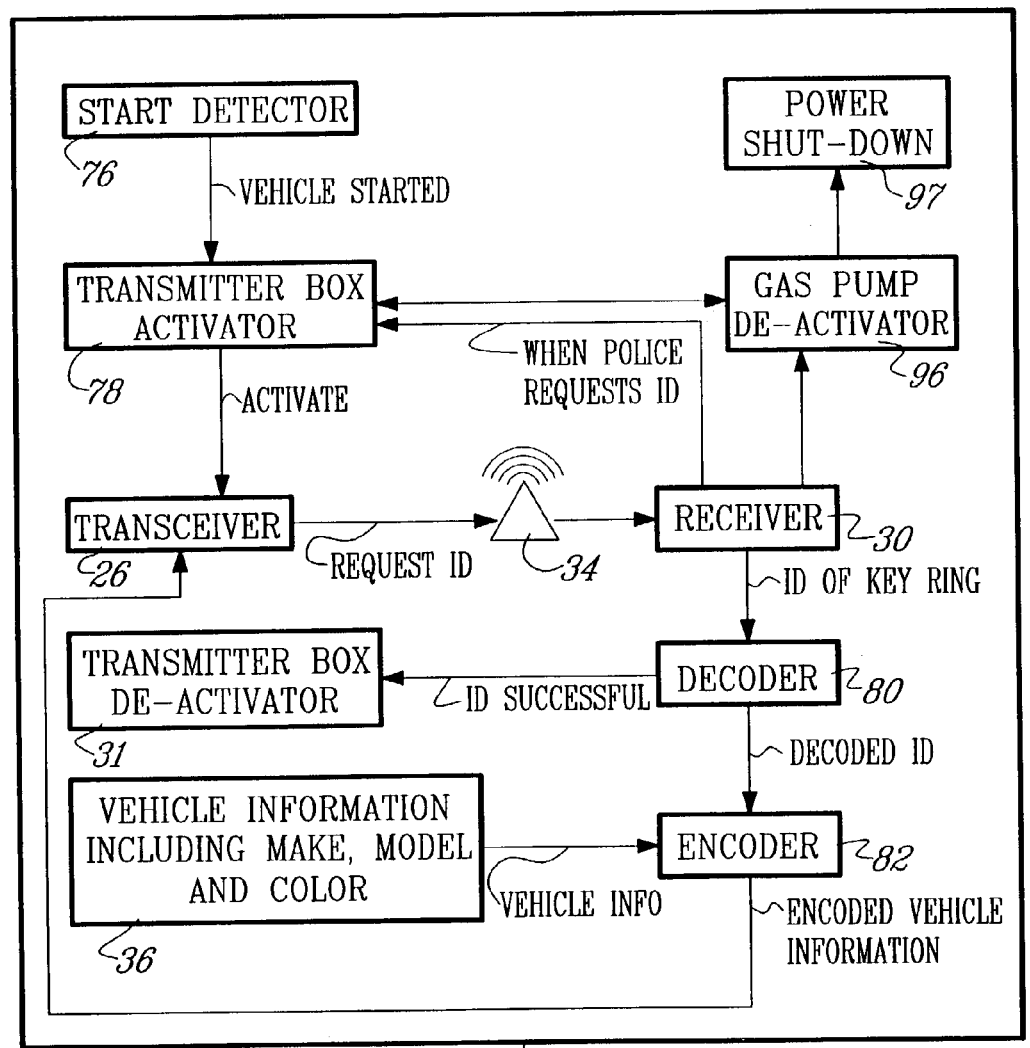
FIG. 5 is a block diagram of the components of the vehicle transceiver box.

FIG. 5 is a block diagram of the main components of the transmitter box 24. a Start Detector 76 detects that the vehicle is started. Starting of the motor can be detected by detecting the powering on of the onboard computer, detecting the turning on of the interrupter or of the gas pump, etc.

The Start Detector 76 sends a signal to the transmitter box Activator 78 to activate the transmitter box 24, preferably after a delay of about 4 seconds after the detection. The transceiver 26 sends a signal at a Frequency A to the key ring identification device 22 to obtain the identification code. The requests is sent via the antenna 34. The key ring identification module 22 responds by emitting a signal at a Frequency A containing the identification code. The signal is received by the receiver 30 which sends the obtained message to the Decoder 80 which decodes the digital code obtained from the memory 23 of the key ring 20. The decoder 80 then verifies the validity of the code 23 and thus the validity of the driver. If the verification fails or if no signal containing an identification code is received after a delay of, preferably, a few seconds, an encoder 82 will encode the information concerning the vehicle 36 and the transceiver 26 of the vehicle transmitter box 24 will start emitting the make code 38 and color 40 of the vehicle at a frequency B, which is preferably 916 MHz. If the verification is successful, the Decoder 80 sends a sleep message to a transmitter box de-activator 31 which deactivates the transmitter box and makes it return to standby mode. The micro-controller 32 preferably combines the functions of the start detector 76, of the transmitter box activator 78, of the transmitter box de-activator 31, of the decoder 80 and of the encoder 82. The vehicle transmitter box 24 is powered by the electrical supply of the vehicle and therefore has a 12 volts supply.

FIG. 6 shows the block diagram of the main components of the police box 44. When the antenna 68 captures a signal at a frequency B and intercepts it, it then transmits it to the receiver 48 which identifies that it is a message from a vehicle transmitter box 24. The decoder 86 extracts from the message the information concerning the vehicle. In order to identify the vehicle, the decoder 86 obtains the proper information corresponding to the codes transmitted by communication with the vehicle information memory 56. The memory contains a list 60 of color codes and their signification and a list 58 of models and makes of vehicles. In another embodiment, the information concerning the stolen vehicle is transmitted directly, for example in ASCII, without using codes to encode the information and then using a list 60 to decode the codes to extract the information concerning the vehicle. A periodical update of the list is therefore not required since the information itself is transmitted to the police box 44.

The decoder 86 prepares that information for display. The decoder 86 sends a signal to the display 62, which is preferably a LCD display. A LED or other luminous indicator 87 can be lit by the receiver 48 once a communication has been received to indicate that a stolen vehicle is nearby. Moreover, a sound warning can be emitted by a warning generator 47 to have the police officer pay attention to the display. The micro-controller 50 preferably controls the decoder 86. The police box 44 is powered by a 12-volt supply. In a preferred embodiment, all of the functional components described herein for each unit are controlled and embodied by the micro controller.

In another embodiment of the present invention, the police officer can use a detection on button 96 to change the mode of the police box 44. The police box 44 then constantly or periodically emits a signal using its transceiver 46 and the antenna 68. The range of emission of this signal is preferably 100 m but can be modified by the police officer depending on the situation. For example, it could be possible to reduce the range of emission in case there is a close monitoring of surrounding vehicles by a plurality of police cars. This signal is picked up by surrounding cars equipped with the anti-theft system of the present invention. Their antenna 34 and receiver 30 intercept the signal from the police box 44. An activation message is sent to the transmitter box activator 78 which uses the transceiver 26 and the antenna 34 to verify if the usage of the vehicle is allowed. Again, the receiver 30 can either receive a message or not and an analysis is made to see if the driver or user has the proper identification. If the identification is incorrect or if there was not message received in response to the identification request, the vehicle starts transmitting its make/model and color. The police car box 44 will then pick up that signal in response to its prompt and will continue the stolen vehicle identification process as discussed earlier. This embodiment is useful in cases where a thief could detect that the vehicle is emitting a constant signal and would abandon the vehicle prior to a police officer having identified it as stolen.

It will be understood that the identification of the driver and/or user could be done in a plurality of ways, such as using a Dallas key, punching a personal identification number on a hidden keyboard, using a key with a hidden transponder, etc.

In any of the embodiments, when need be, the police box 44 has a button 54 which, when activated transmits a signal to a receiver that will close, via wires, an electromechanical relay that will shut off the fuel pump 64 of the vehicle 66. The button 54 turns on a gas pump deactivator 95 which will first verify with the decoder 86 to ensure that there is currently an identified stolen vehicle to ensure that there is a vehicle to be stopped. The transceiver 46 will then prepare a "shut-down gas pump" message to be transmitted using the antenna 68 to the vehicle transmitter box 24. In FIG. 9, the connector J5 would be used to connect the vehicle unit to the gas pump. The electromechanical relay is mounted on the PCB of the vehicle unit. The U2 component of FIG. 9 is, for example, a Song Chuan (861-1C-S-12VDC) relay. There are no external component used to shut down the fuel pump. In FIG. 10, the connector J3 would be used to connect the button (or buttons) to the micro controller to initiate the process of shutting down the fuel pump.

The vehicle transmitter box 24 will receive, using its antenna 34, the message. The receiver 30 will identify that it is a "shut-down gas pump" message and will communicate it to the vehicle gas pump deactivator 96. The vehicle gas pump deactivator 96 will first verify with the transmitter box activator 78 that the anti-theft system is currently in an activated state. If so, the gas pump deactivator 96 will communicate a signal to the power shut-down module 97 to shut down the electrical supply to the gas pump. This will immediately immobilize the vehicle. The police car will then be able to arrest the thief. As will be readily understood, any other means of stopping the vehicle could be used. For example, the gas supply should be shut down. However, shutting down the electrical power supply to the gas pump requires only a simple modification to the electrical wiring of the gas pump and does not require altering the original pieces and electronics of the vehicle. This ensures that the insurance policies covering the vehicle are still valid since no alterations are required.

In order to shut down diesel motors, it is possible to use the existing temperature control circuitry. Indeed, by applying a voltage on the motor temperature sensor, it is possible to shut down the motor since the onboard computer believes that a fatal overheating has occurred. Shutting down the electrical supply of diesel motors is not preferred since the gas pump is used only at the powering on of the vehicle. During normal operation, the motor ensures proper supply by vacuum or by gravity.

The following is a detailed description of the preferred embodiment for each component of the anti-theft system.

1) The identification device 22 is of a diameter of about one inch and about a quarter of an inch thick, and is integrated on the key ring of the driver.
2) The vehicle transmitter box 24 preferably measures 8 cm×5 cm×2.5 cm. It can be hidden in various locations in the vehicle.
3) The police box 44 comprises a LCD that can display two lines of twenty characters and a button that the police officer can press if the thief refuses to surrender. The LCD will display the color and make of the stolen vehicle. A LED 87 may be replaced by a sound signal. The LED or the beep will draw the attention of the police officer.

FIG. 8 is a flow chart of the main steps occurring when using the system of the present invention. First, there is the installation of the client unit 69 with pre-identified key rings 100. Then, the ignition of the motor 101. The client unit is activated 102. The receiver validates 103 the code of the key ring 20. If the code is valid, the unit deactivates 104. If the key ring is missing, the main unit commands the transmitter to send 105 the code (make and color) programmed in the central unit to the police receiver 48. The police officer that receives 106 this message (preferably, within a 100 m radius) gets a display of the vehicle information 107 and has two options 108: stop the vehicle 109 or press the button 54 that activates the circuit breaker of the fuel pump 110. The vehicle unit then shuts down the gas pump 111 and the vehicle is stopped 109.

Figure 9B:
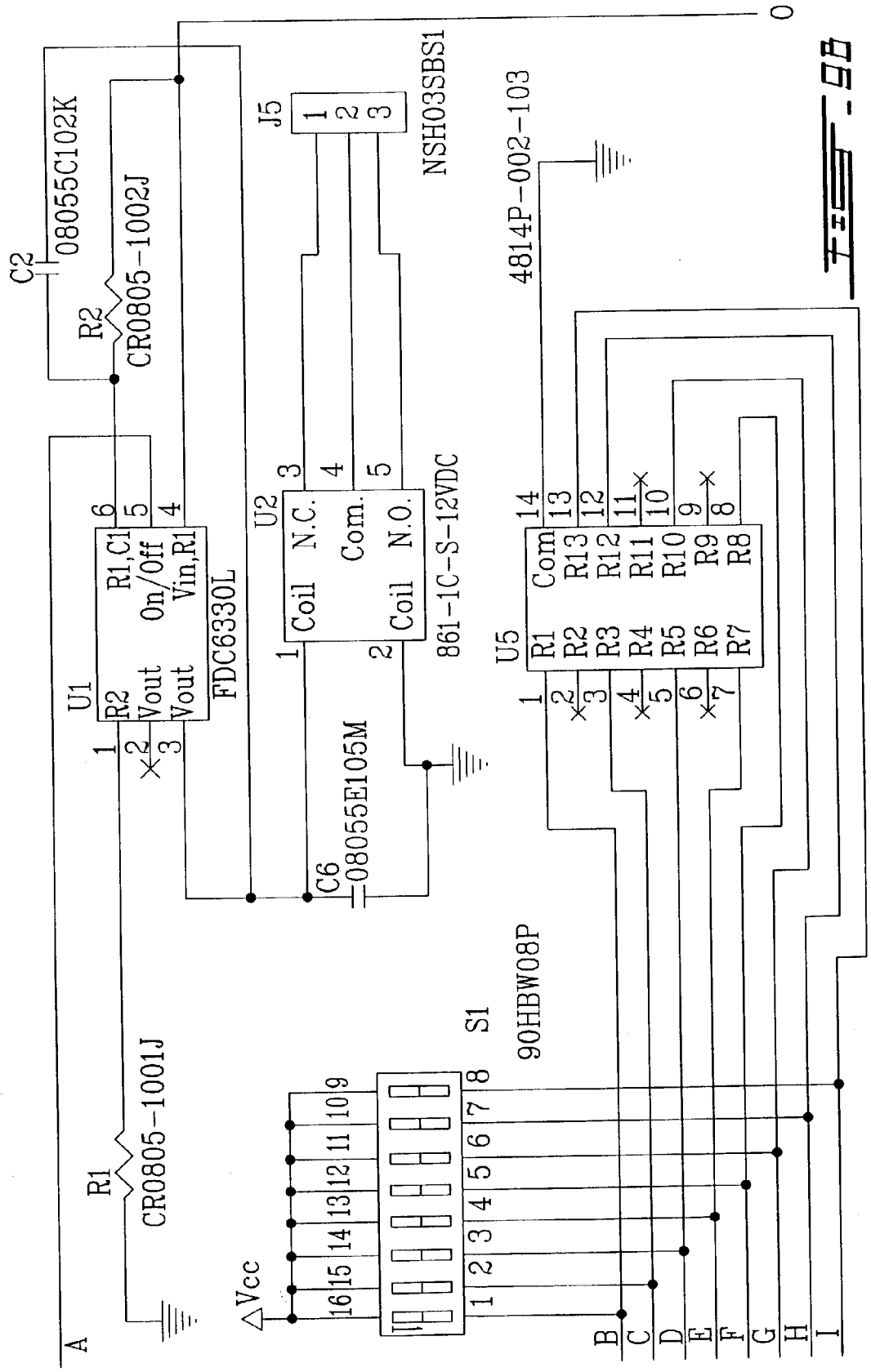
Figure 10A:
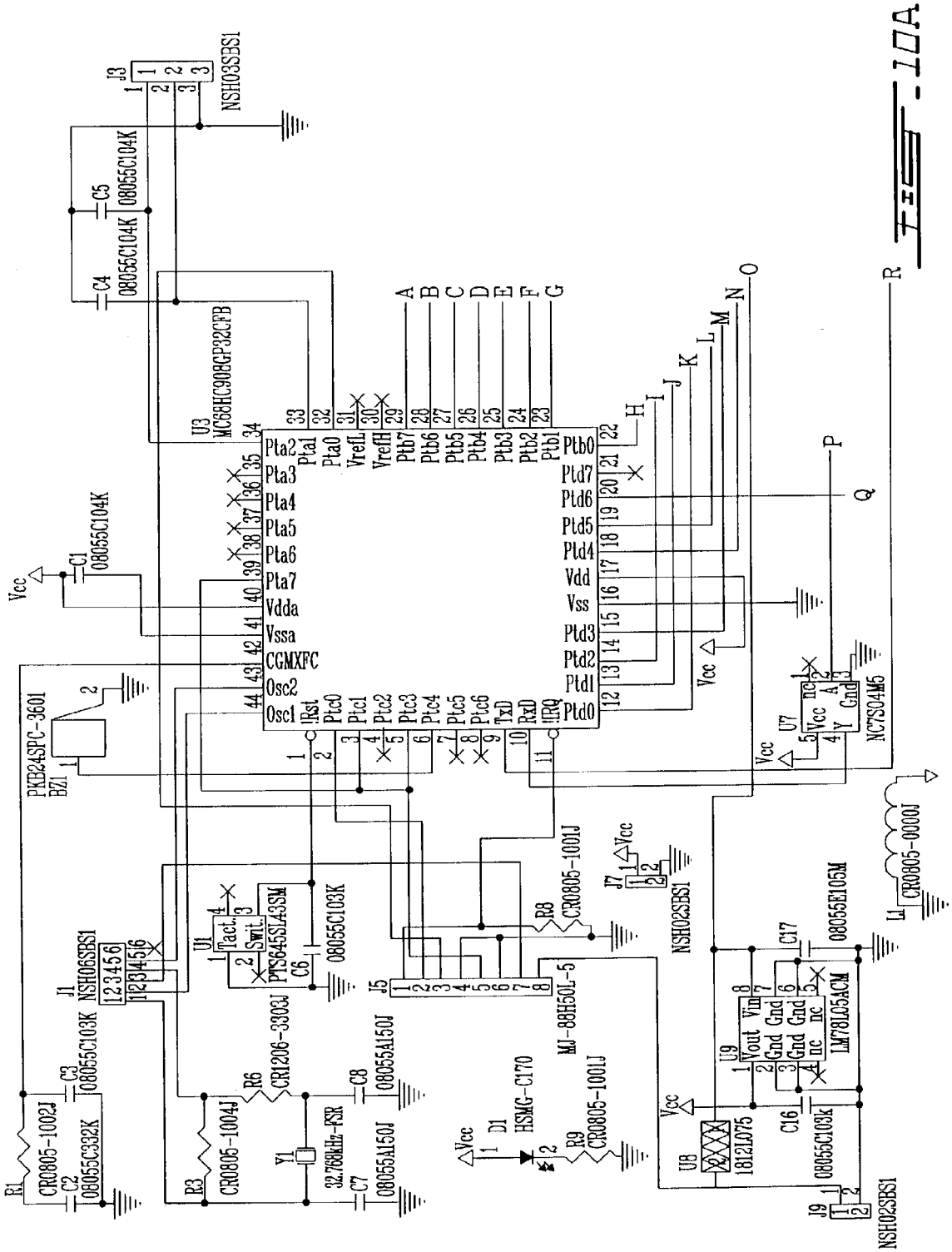
Figure 11:
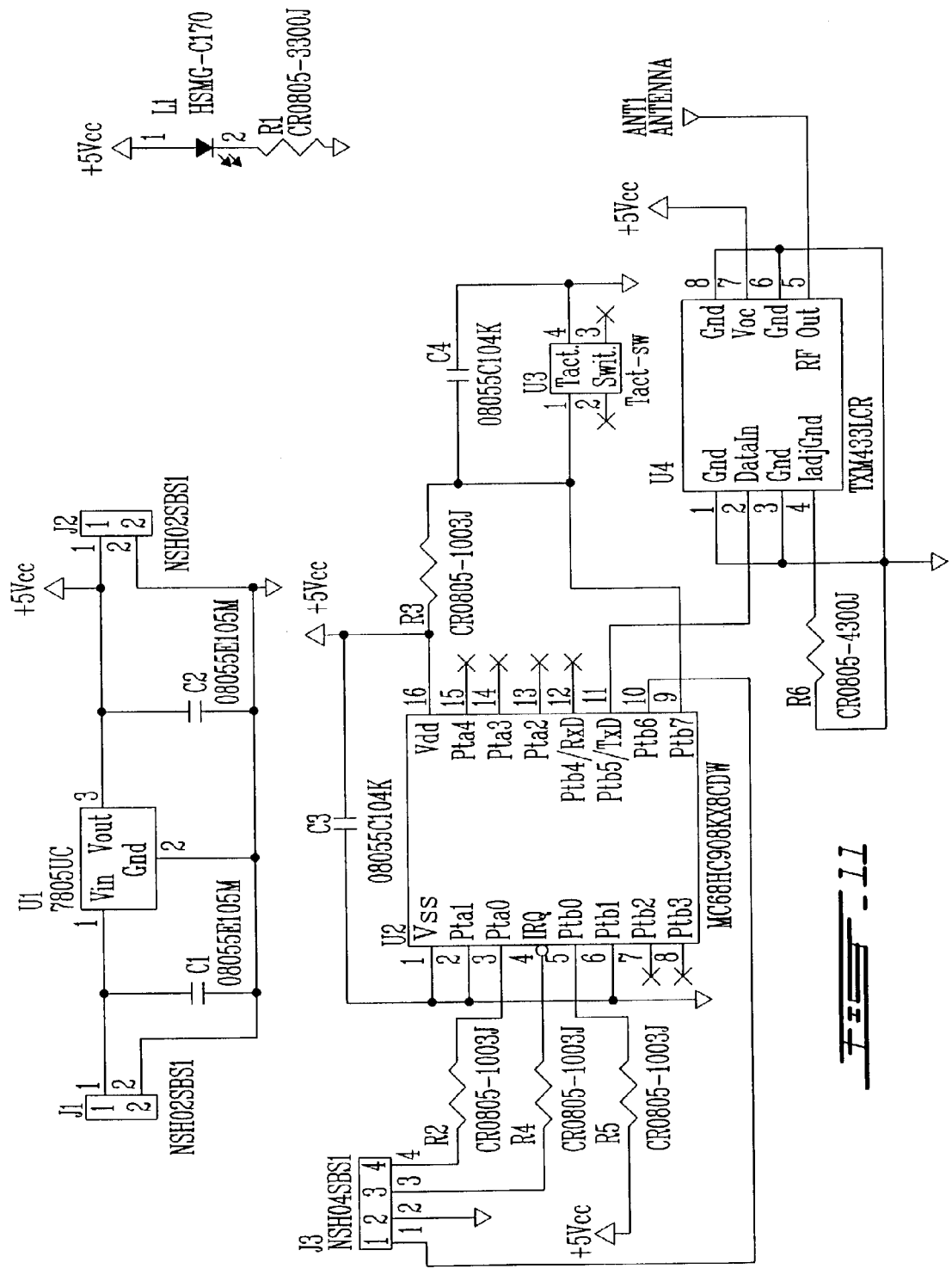
FIG. 11 is a circuit diagram of the preferred key standalone module.

FIG. 9A, FIG. 9B, FIG. 9C, FIG. 10A, FIG. 10B and FIG. 11 are detailed circuit diagrams for the three units, namely the key ring unit in FIG. 11, the vehicle unit in FIG. 9 and the police car unit in FIG. 10. These circuit diagrams will be readily understood by one skilled in the art and contain information concerning the components and parts used together with the connections established between these parts.

It will be understood that the present invention could include a self-test unit which could be triggered manually to ensure that proper detection of the identification device is made and that no signal is emitted if the identification device is in place. Similarly, the self-test unit could be used to verify that a proper alert message is emitted if the identification device is not detected. This self-test unit would simply receive the signal emitted by the vehicle and extract the information to verify its contents. It could report on the status of the unit by lighting up a LED installed in the vehicle.

Similarly, a self-test unit could be provided on the identification device to ensure that the batteries still supply enough power to allow the device to properly respond to an identification request from the vehicle unit. A button could be provided on the identification device which, when pressed, would trigger a test of the power remaining in the battery and light up a small LED (preferably, a green LED) if there is still enough power. If there is not enough power, a red LED could be lit up or no LED could be lit up. Also, the identification device could be equipped with a warning LED which would be lit as soon as the power remaining in the battery is lower than a predetermined threshold. This would warn the owner that the battery needs to be changed to ensure that the anti-theft system would not trigger an alarm because the identification device needs a change of battery.

In case the battery of the identification device is empty, the identification device could be equipped with a connector for the cigarette lighter for example. An adaptor would provide the identification device with power from the cigarette lighter available in most vehicles. The identification device would then be powered by the vehicle battery and would be able to provide its identification to the vehicle unit.

It could also be possible to provide the vehicle unit with a disable module. This disable module would require identification of the identification device to disable the vehicle unit for an undetermined period of time. This would be useful in cases where the owner needs to loan the vehicle to a third party and does not want to provide the third party with the identification device.

It would be possible to integrate in full or in part the police car unit 44 of the present invention into the surveillance computers with which are already provided the police vehicles.

It would be possible to include to the present vehicle unit a towing detector. This detector would detect that the vehicle is being towed using an inclination reading and would instruct the transmitter to start emitting if the key ring is not detected. This additional feature would be useful since vehicles are often stolen by make-believe towing services which simply tow away vehicles into vans or to remote areas.

It will be understood that the present invention could be combined with prior art anti-starter systems will prevent a vehicle from being started if the proper emitting device is not close by or has not touches the receiver placed inside of the dashboard.

It will be understood that any frequencies of communications could be used in the present invention, including cellular frequencies. It is preferable to use a range of frequencies which is unused by most wireless applications to ensure that interferences will not affect the operation of the system.

It will be understood that the system of the present invention should have priority over other devices such as remote starters and the like to ensure its proper operation.

It will be readily understood that the antennas and sensors used in the present invention could be integrated with those already in place in the vehicles.

It should be noted that the present invention can be carried out as a method, can be embodied in a system, a computer readable medium or an electrical or electro-magnetical signal.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for identifying whether a vehicle has been stolen, the method comprising:
   detecting a usage of said vehicle for its transportation from one location to another, through wireless communication with a unit in the vehicle;
   requesting, at the unit in the vehicle, an identification from an identification device;
   if said identification is received automatically and without user intervention, comparing said identification with an internal identification setting;
   if said internal identification setting does not match said received identification or if said identification is not received, emitting an alert message comprising information concerning said vehicle in a predetermined communication range of said vehicle;
   receiving said alert message at a police car unit installed in a displaceable police car, when said police car is within said predetermined communication range of said vehicle; and
   indicating said information concerning said vehicle at said police car unit;
   whereby a thief of said vehicle is unaware of the request for said identification and the vehicle is identified as a stolen vehicle and can be stopped by a police officer circulating in said displaceable police car without an intervention of an owner of said stolen vehicle.

2. A method as claimed in claim 1, further comprising the following steps:
   identifying the stolen vehicle to be stopped at said police car;
   sending a power supply shut-down message to said unit in the vehicle from said displaceable police car;
   shutting down a power supply of said vehicle,
   whereby said police officer can choose to stop said stolen vehicle by shutting down its power supply.

3. A method as claimed in claim 2, wherein said power supply is an electrical power supply to a gas pump of said vehicle.

4. A method as claimed in claim 2, wherein said power supply is a gas supply to a gas pump of said vehicle.

5. A method as claimed in claim 2, wherein said power supply is an electrical power supply to an onboard computer of said vehicle.

6. A method as claimed in claim 1, wherein said step of detecting comprises detecting a powering on of an onboard computer of said vehicle.

7. A method as claimed in claim 1, wherein said identification is coded using four bytes.

8. A method as claimed in claim 1, further comprising a step of self-testing said emitting by receiving, at said vehicle unit, said emitted alert message and extracting the information.

9. A method as claimed in claim 1, wherein said receiving said identification comprises said identification device sending a response to said request, said response comprising said identification and said unit in the vehicle receiving said response.

10. A method as claimed in claim 1, wherein said alert message comprises at least a color, a make and a model of said vehicle.

11. A method as claimed in claim 1, wherein said alert message is wirelessly broadcasted and said predetermined communication range is a range of 100 m.

12. A method as claimed in claim 1, wherein said identification is factory encoded into said identification device.

13. A method as claimed claim 1, wherein said information is programmed into said unit in the vehicle using an external user interface.

14. A method as claimed in claim 1, wherein said usage is an ignition of a motor of said vehicle.

15. A method as claimed claim 1, wherein said usage is a motion of said vehicle.

16. A method as claimed claim 1, wherein said usage is a towing of said vehicle.

17. A method as claimed claim 1, wherein said method is prompted by receiving a beacon from said police car unit.

18. A method as claimed in claim 17, wherein said beacon is wireless emission of a signal requesting a response from said stolen vehicle.

19. A method as claimed in claim 17, wherein said step of requesting comprises starting a wireless communication and emitting a request message.

20. A method as claimed in claim 1, wherein said requesting is done via an RF identification module.

21. A method as claimed in claim 1, wherein said identification device is a key ring equipped with a transponder having an encoded identification.

22. A method as claimed in claim 2, further comprising a step of verifying a status of said vehicle prior to said step of shutting down to ensure that said shutting down is not done on a vehicle which is not stolen.

23. A method as claimed in claim 1, further comprising a step of checking a battery status of said identification device and emitting a warning if a power remaining in said battery is below a predetermined threshold.

24. A method as claimed in claim 23, wherein said emitting a warning comprises lighting up a light-emitting diode (LED).

25. A method as claimed in claim 1, further comprising a step of supplying power to said identification device by connecting said identification device to an external power supply.

26. An anti-theft system for identifying whether a vehicle has been stolen, the anti-theft system comprising:
   an identification device comprising:
      an identification request receiver for receiving an identification request;
      an identification store having a stored identification;
      an identification provider for retrieving said stored identification and sending said stored identification in response to said identification request automatically and without user intervention;

a vehicle anti-theft device comprising:
  a unit in wireless communication with the identification device for detecting a usage of said vehicle for its transportation from one location to another;
  a vehicle transmitter for requesting an identification of a driver of said vehicle once said usage is detected from said identification device;
  a vehicle receiver for receiving a response to said request for said identification from said identification device;
  an information store having information concerning said vehicle and an internal identification setting;
  an owner detector for detecting if said internal identification setting matches an identification received in said response;
  an information emitter for emitting said information concerning said vehicle if said identification received does not match said internal identification setting in a predetermined communication range of said vehicle;
whereby said information concerning said vehicle is received by a displaceable patrol car when said patrol car is within said predetermined communication range of said vehicle and said vehicle is identified as being stolen by an officer circulating in said patrol car and can be stopped without an intervention of an owner of said vehicle being stolen.

* * * * *